(12) United States Patent
Slaby et al.

(10) Patent No.: US 10,941,532 B2
(45) Date of Patent: Mar. 9, 2021

(54) UTILITY WHISKER BROOM

(71) Applicant: Clark Equipment Company, West Fargo, ND (US)

(72) Inventors: Michal Slaby, Tábor (CZ); Vaclav J. Jelinek, River Edge, NJ (US); Michael L. Vought, Moorhead, MN (US)

(73) Assignee: CLARK EQUIPMENT COMPANY, West Fargo, ND (US)

( * ) Notice: Subject to any disclaimer, the term of this patent is extended or adjusted under 35 U.S.C. 154(b) by 0 days.

(21) Appl. No.: 15/695,506

(22) Filed: Sep. 5, 2017

(65) Prior Publication Data

US 2018/0066407 A1 Mar. 8, 2018

Related U.S. Application Data

(60) Provisional application No. 62/383,095, filed on Sep. 2, 2016, provisional application No. 62/393,917, filed on Sep. 13, 2016.

(51) Int. Cl.
*E01H 1/04* (2006.01)
*E02F 3/96* (2006.01)
(Continued)

(52) U.S. Cl.
CPC ............ *E01H 1/04* (2013.01); *A46B 5/0041* (2013.01); *A46B 7/06* (2013.01); *A46B 13/001* (2013.01); *B60P 1/48* (2013.01); *B65F 3/041* (2013.01); *E02F 3/088* (2013.01); *E02F 3/142* (2013.01); *E02F 3/40* (2013.01); *E02F 3/404* (2013.01);
(Continued)

(58) Field of Classification Search
CPC ........... E01H 1/04; E01H 1/02; A46B 5/0041; A46B 7/06; A46B 7/00; A46B 13/001; A46B 2200/302; A46B 2200/3066; B60P 1/48; B65F 3/041; E02F 3/088; E02F 3/142; E02F 3/40; E02F 3/404; E02F 3/962; F16K 31/44
See application file for complete search history.

(56) References Cited

U.S. PATENT DOCUMENTS 3,669,293 A * 6/1972 Bryan ...................... B60P 1/48
294/104
4,372,063 A * 2/1983 Work .................. A01G 23/093
37/301
(Continued)

OTHER PUBLICATIONS

International Search Report and Written Opinion dated Nov. 23, 2017 for International Application No. PCT/US2017/050080 filed Sep. 5, 2017, 15 pages.
(Continued)

*Primary Examiner* — Jamie L McGowan
(74) *Attorney, Agent, or Firm* — John Veldhuis-Kroeze; Westman, Champlin & Koehler, P.A.

(57) ABSTRACT

A first work tool arm is rotatably attached to a frame or reference structure, a second work tool arm rotatably attached to the first work tool arm, and a work tool attached to an end of the second work tool arm. An actuator and a spring are each rotatably attached to the second work tool arm and configured such that separate movement of the first work tool arm relative to the frame or reference structure and movement of the second work tool arm and work tool relative to the first work tool arm are achieved with actuation of the actuator.

20 Claims, 10 Drawing Sheets

(51) Int. Cl.
*E02F 3/08* (2006.01)
*E02F 3/14* (2006.01)
*E02F 3/40* (2006.01)
*A46B 5/00* (2006.01)
*A46B 7/06* (2006.01)
*A46B 13/00* (2006.01)
*B60P 1/48* (2006.01)
*B65F 3/04* (2006.01)
*F16K 31/44* (2006.01)
*E01H 1/02* (2006.01)
*A46B 7/00* (2006.01)

(52) U.S. Cl.
CPC .............. *E02F 3/962* (2013.01); *F16K 31/44* (2013.01); *A46B 7/00* (2013.01); *A46B 2200/302* (2013.01); *A46B 2200/3066* (2013.01); *E01H 1/02* (2013.01)

(56) References Cited

U.S. PATENT DOCUMENTS

| | | | | |
|---|---|---|---|---|
| 4,895,476 A * | 1/1990 | Vangaever | ............... | E01C 19/15 404/108 |
| 4,925,359 A * | 5/1990 | Dunnegan | ............... | E02F 3/404 414/704 |
| D332,271 S * | 1/1993 | DuBose | ......................... | D15/32 |
| 5,564,885 A * | 10/1996 | Staben, Jr. | ............ | E02F 3/3631 37/403 |
| 5,639,205 A * | 6/1997 | Kaczmarczyk | ........ | A01B 43/00 37/406 |
| 5,957,650 A * | 9/1999 | Rollo | ...................... | E02F 3/404 37/406 |
| 5,967,650 A | 9/1999 | Rollo | | |
| 6,074,160 A * | 6/2000 | Brumbaugh | .......... | E02F 3/3609 37/903 |
| 6,267,547 B1 * | 7/2001 | Lund | ...................... | B66F 9/065 294/68.1 |
| 6,357,993 B1 * | 3/2002 | Burton | ...................... | E02F 3/34 37/406 |
| 7,241,101 B2 * | 7/2007 | Bauer | ................. | A01F 25/2027 414/726 |
| 7,249,429 B2 * | 7/2007 | Truan | ..................... | B62D 49/04 15/78 |
| 7,428,767 B2 | 9/2008 | Lougheed | | |
| 7,431,554 B2 * | 10/2008 | Westendorf | ............. | B66C 1/585 294/201 |
| 8,069,591 B2 * | 12/2011 | Dunn | ................. | A01D 87/0076 37/406 |
| 8,109,709 B1 * | 2/2012 | Gaetze | .................... | E02F 3/404 37/406 |
| 8,615,907 B2 * | 12/2013 | Miller | ..................... | E02F 3/404 172/615 |
| 9,611,618 B2 * | 4/2017 | Miller | ..................... | E02F 3/404 |
| 2002/0104178 A1 * | 8/2002 | Truan | ..................... | B62D 49/04 15/78 |
| 2007/0101621 A1 | 5/2007 | Arp | | |
| 2011/0318158 A1 | 12/2011 | Miller et al. | | |
| 2015/0275465 A1 | 10/2015 | Zimmerman | | |

OTHER PUBLICATIONS

First Office Action, including search report, for Chinese Patent Application No. 201780050815.2, dated Dec. 18, 2020, 21 pages.

* cited by examiner

UTILITY WHISKER BROOM

CROSS-REFERENCE TO RELATED APPLICATIONS

The present application is based on and claims the benefit of U.S. provisional patent application Ser. No. 62/383,095, filed Sep. 2, 2016, and U.S. provisional patent application Ser. No. 62/393,917, filed Sep. 13, 2016, the contents of which are hereby incorporated by reference in their entireties.

BACKGROUND

The present disclosure is related to implements and accessories for implements that are attachable to power machines. More particularly, the present disclosure is related to implements or implement accessories that include an actuable arm and a separate tool or work element that is moveable relative to the actuable arm.

Power machines, for the purposes of this disclosure, include any type of machine that generates power to accomplish a particular task or a variety of tasks. One type of power machine is a work vehicle. Work vehicles are generally self-propelled vehicles that have a work device, such as a lift arm (although some work vehicles can have other work devices) that can be manipulated to perform a work function. Some examples of work vehicle power machines include loaders, excavators, utility vehicles, tractors, and trenchers, to name a few.

Some power machines can be operably coupled to implements that are capable of cooperating with the power machine to perform tasks such as cleaning up garbage or debris and loading it into a truck for removal. For example, various sweeper implements can be used to clean up debris. Sweeping garbage of various sizes into one pile, moving the pile into the bucket of a loader or other power machine, and loading the pile into a truck for removal can present challenges. When material is light, it can be difficult to load debris and maintain the debris within a regular bucket. Rotary sweeper type implements are designed to clean up small sized debris such as dust, gravel, cigarette stubs, etc. Generally, rotary sweepers are not designed to collect larger sized debris or garbage, such as cardboard boxes.

It can be desirable in an implement, or an accessory for an implement, to be able to have separate movement of both an implement arm (as opposed to, say, a lift arm on a power machine to which the implement is operably coupled) that positions a tool relative to a portion of the implement and movement of the tool relative to the implement arm. Generally, to accomplish movement of both the implement arm and the tool, multiple actuators must be utilized. This can increase complexity and cost of the implement.

The discussion in this Background is merely provided for general background information and is not intended to be used as an aid in determining the scope of the claimed subject matter.

SUMMARY

This Summary and the Abstract are provided to introduce a selection of concepts in a simplified form that are further described below in the Detailed Description. The summary and the abstract are not intended to identify key features or essential features of the claimed subject matter.

Disclosed embodiments have a first work tool arm rotatably attached to a frame or reference structure, a second work tool arm rotatably attached to the first work tool arm, and a work tool attached to an end of the second work tool arm. An actuator and a biasing element are each rotatably attached to the second work tool arm and configured such that separate movement of the first work tool arm relative to the frame or reference structure and movement of the second work tool arm and work tool relative to the first work tool arm are achieved with actuation of the actuator.

In one exemplary embodiment, a work element configured for use with an implement of a power machine includes a work element lift arm configured to be pivotally coupled to the implement of the power machine. A work tool arm is pivotally coupled to the work element lift arm, and a work tool is attached to the work tool arm. A work element actuator is pivotally coupled to the work tool arm and is configured to be pivotally coupled to the implement of the power machine. A biasing mechanism coupled between the work element lift arm and the work tool arm establishes a priority of movement of the work element lift arm and the work tool arm responsive to actuation of the work element actuator such that the work element actuator is configured to selectively pivotally move the work element lift arm relative to the implement of the power machine and to selectively pivotally move the work tool arm relative to the work element lift arm.

In some exemplary embodiments, the work element actuator and the biasing mechanism are arranged and configured such that when neither of the work element lift arm and the work tool arm are positioned to have travel prevented by the respective first and second stops, retraction of the work element actuator causes rotation of the work tool arm relative to the work element lift arm, and extension of the work element actuator causes rotation of the work element lift arm relative to the implement of the power machine.

Further, in some exemplary embodiments, the work element actuator, the biasing mechanism, and the first and second stops are arranged and configured such that retraction of the work element actuator causes rotation of the work tool arm relative to the work element lift arm until movement of the work tool arm relative to the work element lift arm is prevented by the second stop, and then further retraction of the work element actuator causes rotation of the work element lift arm relative to the implement of the power machine. Extension of the work element actuator causes rotation of the work element lift arm relative to the implement of the power machine until movement of the work element lift arm is prevented by the first stop, and then further extension of the work element actuator causes rotation of the work tool arm relative to the work element lift arm.

In another exemplary embodiment, a method of controlling a work element is provided. The work element has a work element lift arm pivotally coupled to an implement, a work tool arm pivotally coupled to the work element lift arm, a work tool attached to the work tool arm, and a biasing mechanism coupled between the work tool arm and the work element lift arm. The method includes retracting and extending a work element actuator pivotally coupled to the work tool arm and to the implement, and using the biasing mechanism to establish priority of movement between the work element lift arm and the work tool arm. Using the established priority of movement, when neither of the work element lift arm and the work tool arm are positioned to have travel prevented by a stop mechanism, retraction of the work element actuator causes rotation of the work tool arm relative to the work element lift arm, and extension of the work element actuator causes rotation of the work element lift arm relative to the implement. When movement of the lift arm is prevented by a first stop mechanism during extension of the work element actuator, further extension of the work element actuator causes rotation of the work tool arm relative to the work element lift arm. When movement of the work tool arm is prevented by a second stop mechanism during retraction of the work element actuator, further retraction of the work element actuator causes rotation of the work element lift arm relative to the implement.

DETAILED DESCRIPTION

The concepts disclosed in this discussion are described and illustrated with reference to exemplary embodiments. These concepts, however, are not limited in their application to the details of construction and the arrangement of components in the illustrative embodiments and are capable of being practiced or being carried out in various other ways. The terminology in this document is used for the purpose of description and should not be regarded as limiting. Words such as "including," "comprising," and "having" and variations thereof as used herein are meant to encompass the items listed thereafter, equivalents thereof, as well as additional items.

Disclosed concepts are used to provide an implement, or an accessory attachable to an implement, which has a first work tool arm rotatably attached to a frame or reference structure. A second work tool arm is rotatably attached to the first work tool arm, and a work tool is attached to an end of the second work tool arm. An actuator and a biasing element are each rotatably attached to the second work tool arm and configured such that separate movement of the first work tool arm relative to the frame or reference structure and movement of the second work tool arm and work tool relative to the first work tool arm are achieved with actuation of the same actuator. This allows more complex work tasks, involving multiple movements, to be achieved with a single actuator (or set of parallel actuators). In exemplary embodiments, disclosed concepts are used in a whisker broom implement or implement accessory to achieve different movements for sweeping debris. Other exemplary embodiments include the use of disclosed concepts in other implement types.

Disclosed concepts can be practiced on various implements and various power machines, as will be described below. Representative implements 100, 100', 100" on which the embodiments can be practiced and representative power machines 10 and 10' to which the implement can be operably coupled are illustrated in diagram form in FIGS. 1-3 and described below before any embodiments are disclosed. For the sake of brevity, only one implement and power machine combination is discussed in detail. However, as mentioned above, the embodiments below can be practiced on any of a number of implements and these various implements can be operably coupled to a variety of different power machines. Power machines, for the purposes of this discussion, include a frame, in some instances at least one work element, and a power source that is capable of providing power to the work element to accomplish a work task. One type of power machine is a self-propelled work vehicle. Self-propelled work vehicles are a class of power machines that include a frame, work element, and a power source that is capable of providing power to the work element. At least one of the work elements is a motive system for moving the power machine under power.

Figure 1:
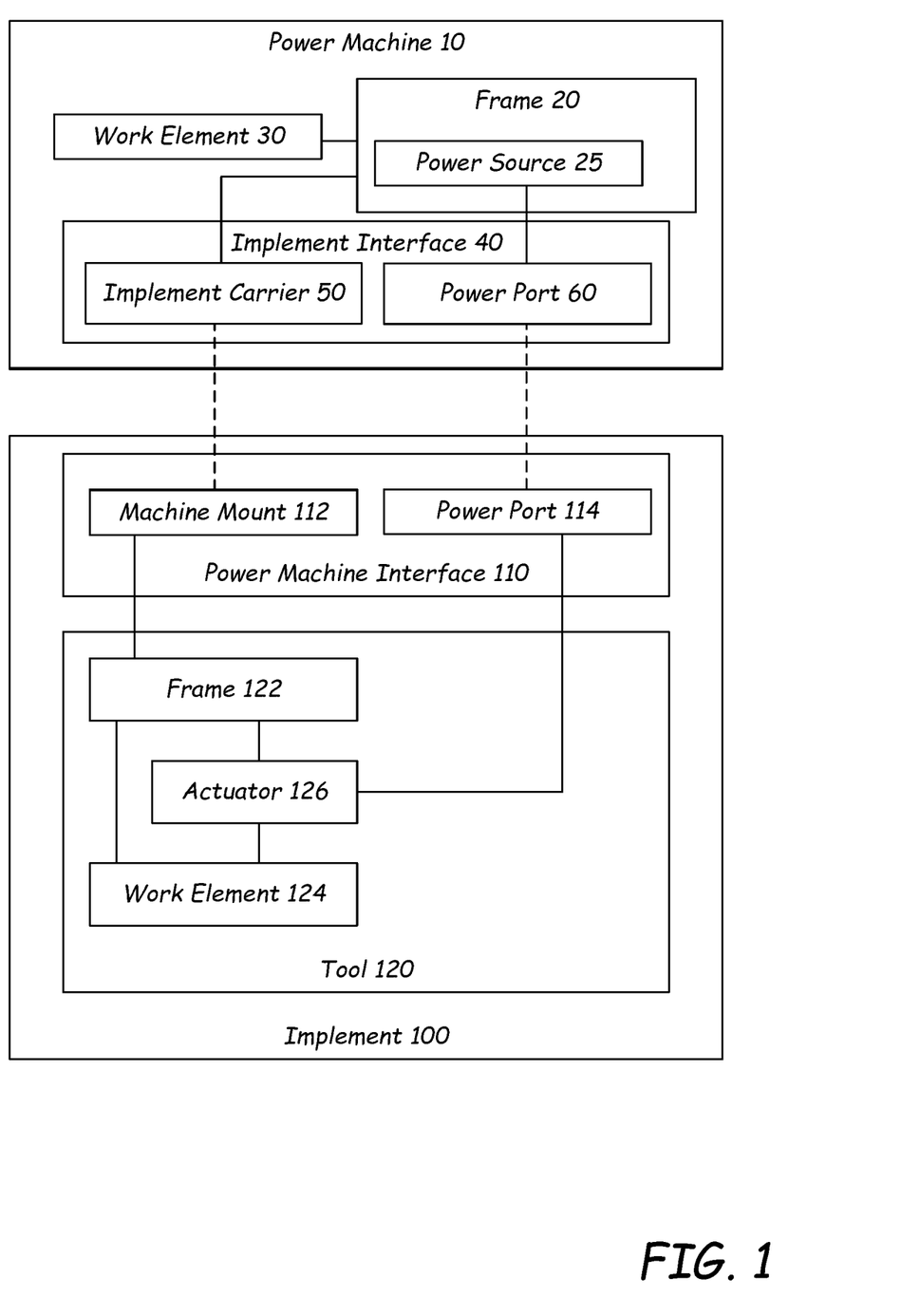
FIGS. 1-3 are each block diagrams illustrating functional systems of a representative implement on which embodiments of the present disclosure can be practiced and a power machine to which the representative implement can be coupled.

Referring now to FIG. 1, a block diagram illustrates basic systems of power machine 10 as are relevant to interact with implement 100 as well as basic features of implement 100, which represents an implement upon which the embodiments discussed below can be advantageously incorporated. At their most basic level, power machines for the purposes of this discussion include a frame 20, a power source 25, a work element 30, and, as shown in FIG. 1, an implement interface 40. On power machines such as loaders and excavators and other similar work vehicles, implement interface 40 includes an implement carrier 50 and a power port 60. The implement carrier 50 is typically rotatably attached to a lift arm or another work element and is capable of being secured to the implement. The power port 60 provides a connection for the implement 100 to provide power from the power source to the implement. Power source 25 represents one or more sources of power that are generated on power machine 10. This can include either or both of pressurized fluid and electrical power.

The implement 100, which is sometimes known as an attachment or an attachable implement, has a power machine interface 110 and a tool 120, which is coupled to the power machine interface 110. The power machine interface 110 illustratively includes a machine mount 112 and a power port 114 for coupling with power machine 10. Machine mount 112 can be any structure capable of being coupled to the implement interface 40 of power machine 10. Power port 114, in some embodiments, includes hydraulic and/or electrical couplers. Power port 114 can also include a wireless electrical connection, as may be applicable on a given implement. While both machine mount 112 and power port 114 are shown, some implements may have only one or the other as part of their power machine interface 110. Other implements, such as a bucket and some simple forklifts, would not have a power port 114 at all (e.g., See FIG. 3). Some other forklifts may have an actuator for adjusting its tines vertically, horizontally, rotationally, or by extending them in response to power signals received from the power machine 10 at power port 114.

In instances where a power machine has a specific implement carrier, the machine mount 112 will include a structure that complements the specific implement carrier. For power machines without an implement carrier, the machine mount includes features to directly mount the implement 100 to the power machine 10 such as bushings to accept pins for mounting the implement to a lift arm and an actuator for moving the implement.

For the purposes of this discussion, implements can be categorized as simple or complex. A simple implement has no actuated work element. One example of a simple implement is a bucket or a forklift without actuable tines. A complex implement has at least one actuable work element such as a forklift with actuable tines. Complex implements are further divided into those that have one actuable work element and those that have multiple work elements. Some complex implements include features of a simple implement. For example, disclosed whisker broom implements include, or are attached to, a bucket.

In FIG. 1, the implement 100 illustrates a tool 120 for a complex implement with a single work element 124. The tool 120 includes a frame 122, which is coupled with or integral to the machine mount 112. A work element 124 is coupled to the frame 122 and is moveable in some way (vertical, horizontal, rotation, extension, etc.) with respect to the frame. An actuator 126 is mounted to the frame 122 and the work element 124 and is actuable under power to move the work element with respect to the frame. Power is provided to the actuator 126 via the power machine. Power is selectively provided in the form of pressurized hydraulic fluid (or other power source) directly from the power machine 10 to the actuator 126 via power ports 60 and 114.

Figure 2:
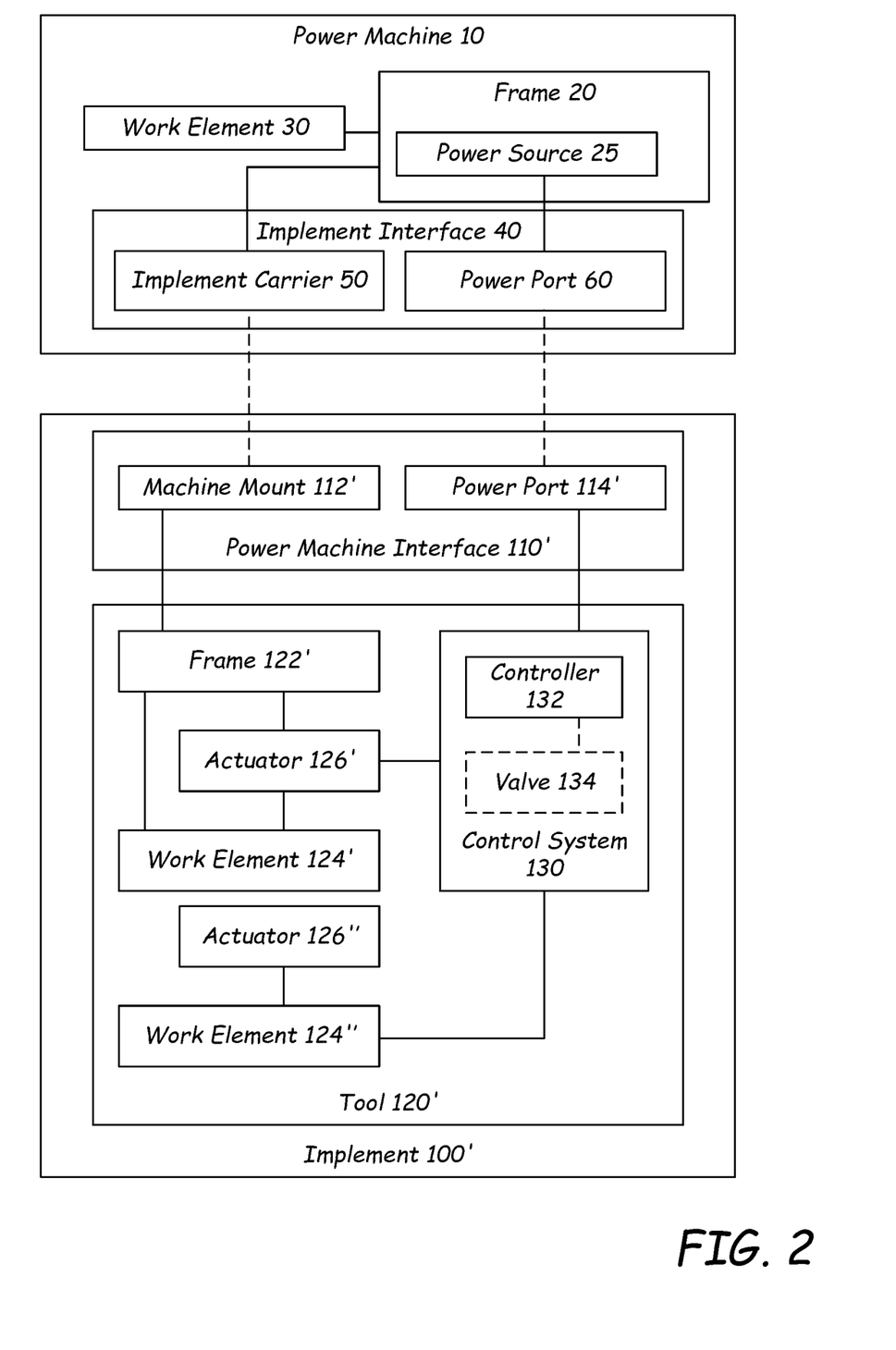

FIG. 2 illustrates an implement 100', which depicts a complex, multi-function implement. The features in FIG. 2 that are similarly numbered to those in FIG. 1 are substantially similar and are not discussed again here for the sake of brevity. Implement 100' has one or more additional work elements 124", which are shown in block form. Each work element 124" has a corresponding actuator 126" coupled thereto for controlling movement of the work element 124". A control system 130 receives power from the power machine and selectively provides power to the actuators 126' and 126" in response to signals from operator inputs. The control system 130 includes a controller 132, which is configured to receive electrical signals from the power machine 10 indicative of operator input manipulation and control power to the various actuators based on those electrical signals. The controller 132 can provide electrical signals to some or all of the actuators 126' and 126" to control their function. Alternatively, the controller 132 can control optional valve 134, which in turn controls actuation of some or all of the actuators 126' and 126" by providing pressurized hydraulic fluid to the actuators.

Although not shown in FIG. 2, in some instances, controller 132 can receive signals indicative of operator actuation of user inputs that are mounted on the implement, as opposed to the power machine. In these applications, the implement is controlled from an operator position that is located remotely from the power machine (i.e. next to the implement 100').

Figure 3:
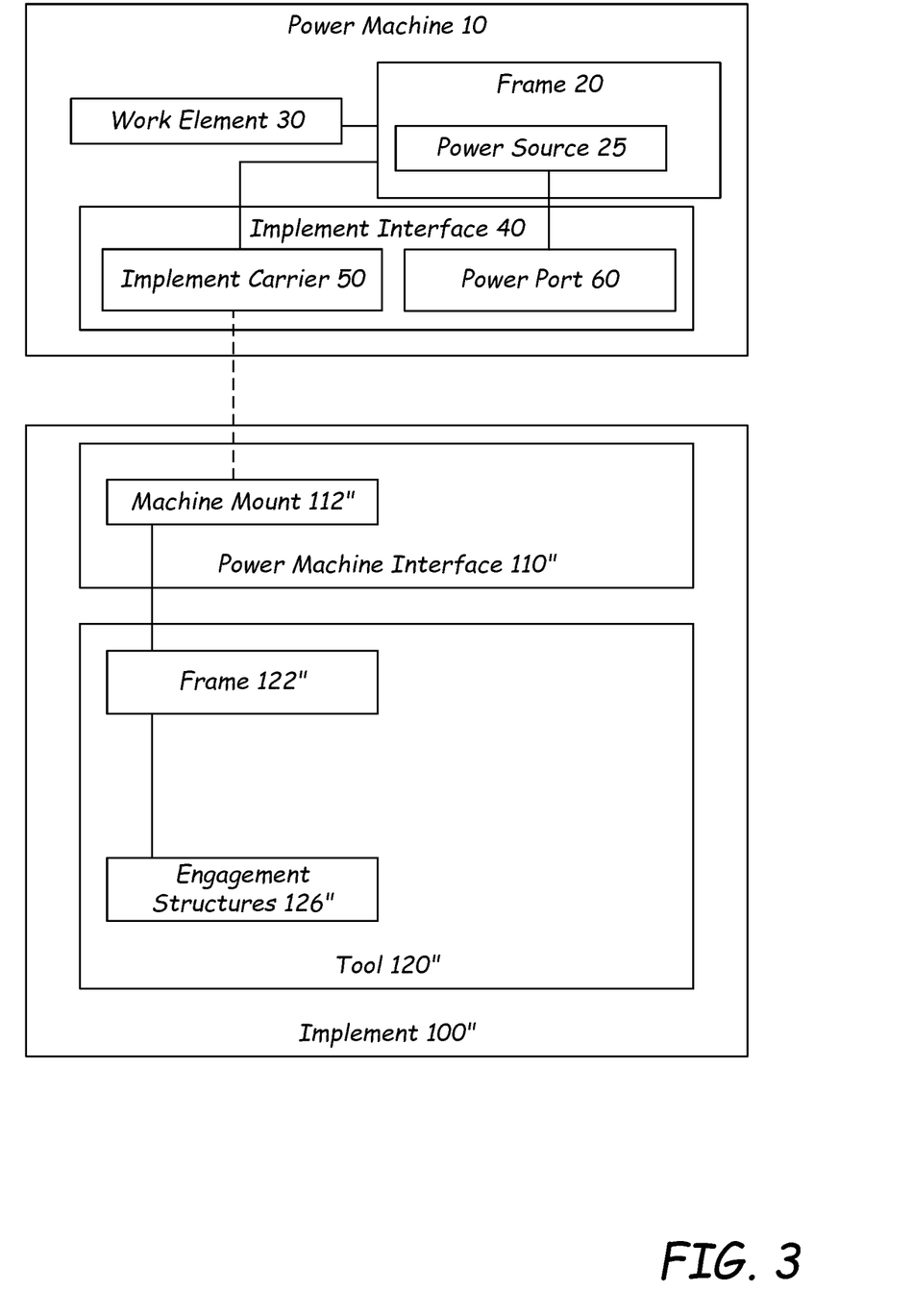

FIG. 3 illustrates an implement 100", which depicts a simple implement. The features in FIG. 3 that are similarly numbered to those in FIG. 1 are substantially similar and are not discussed again here for the sake of brevity. Implement 100" has one or more engagement structures 126" that is fixedly or moveably attached to the frame 122". Unlike a work element, which is powered by an actuator to move relative to the frame to perform a work function, the engagement structure can engage a medium to perform, in combination with the power machine, work. For example, a simple bucket has an engagement structure including a cutting edge and a defined volume that holds soil or material that is collected into a bucket. As another example, tines of a forklift can be mounted to the frame of the forklift implement for engaging a pallet. Such tines can be adjustable, but in many cases, the tines themselves are not moveable under power to perform work, but are instead engagement structures for engaging and supporting a load to be lifted and/or carried.

A power machine interface can include a machine mount in the form of a generally planar interface plate that is capable of being coupled to an implement carrier on a loader. In embodiments, various types of machine mounts can be employed. The power machine interface can also include a power port (e.g., see interfaces 110 and 110' of FIGS. 1 and 2 respectively), or not such as with the power machine interface 110" of FIG. 3. When the power machine interface includes a power port, the power port can include hydraulic conduits that are connectable to conduits on a power machine so that pressurized hydraulic fluid can be selectively provided to an actuator on the implement to actuate a connected working element. The power port can also include an electrical connection, which can be connectable to a controller (such as controller 132 of FIG. 2) and actuators on a valve (such as valve 134). The controller and valve can be included in a control system (such as control system 130) on the implement for controlling functions thereon.

Figure 4:
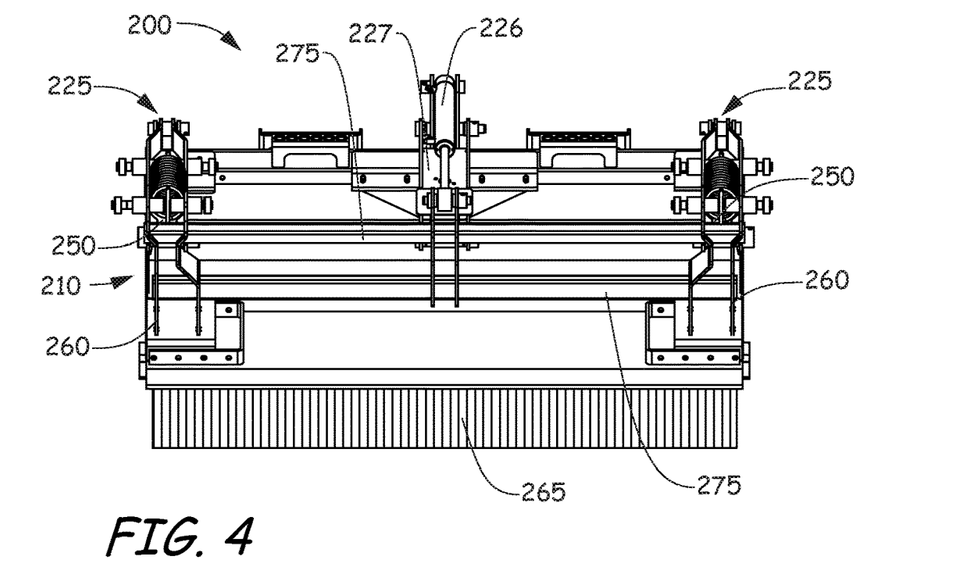
FIG. 4 is a front view of a utility whisker broom implement, or an accessory for an implement, which is one example embodiment of the implements illustrated in FIGS. 1-3.
Figure 5:
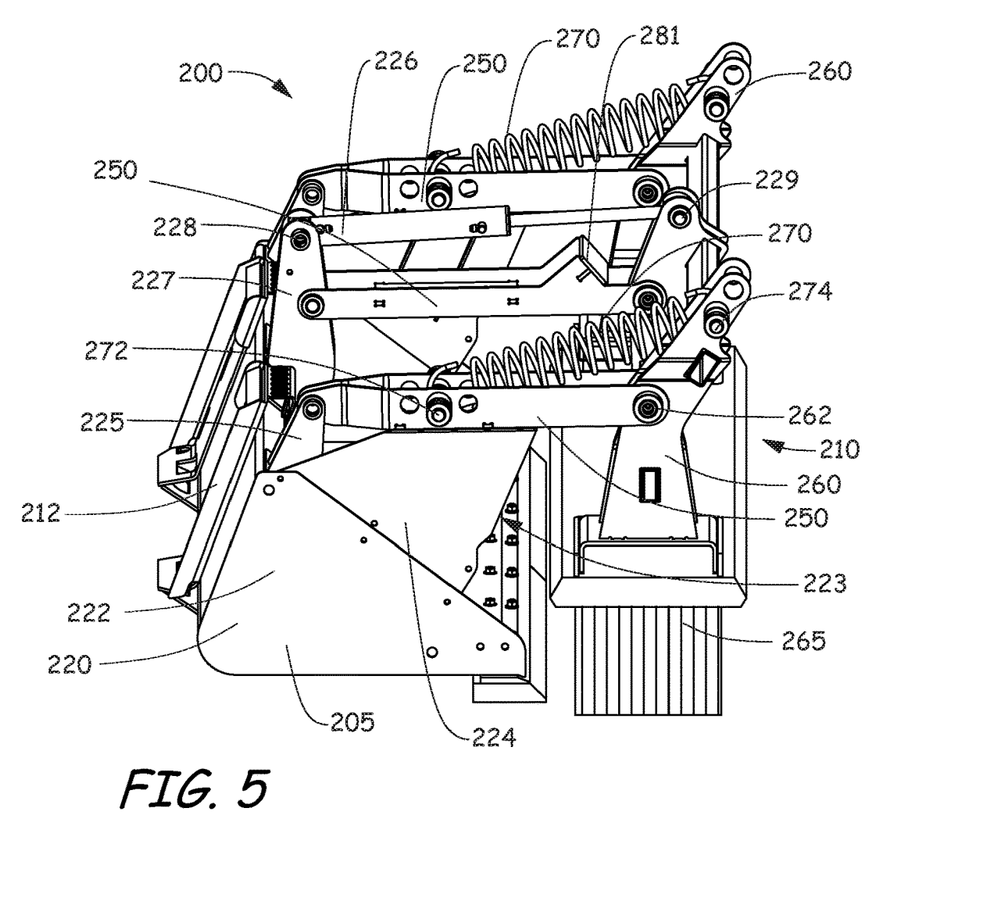
FIG. 5 is a side perspective view of the implement shown in FIG. 4, illustrating components of the implement.

FIGS. 4-5 illustrate an embodiment of implement/accessory combination 200, which can be in accordance with, and include features of, the implements illustrated in FIGS. 1-3. In the illustrated embodiment, combination 200 includes a bucket implement 205 and a whisker broom accessory 210 that is operably coupled to the bucket implement. Alternatively, the whisker broom can be work element as part of a bucket implement. For the purpose of this discussion, the difference between an accessory and a work element integral to an implement is that the accessory is a self-contained device that can be removed from the implement. The use of an accessory of this type can be useful to allow use of the accessory on different implements or allow use of the implement without the accessory. In the embodiment shown in FIGS. 4-8, a whisker broom accessory is coupled to a bucket and is described as such below. It should be appreciated, however, that the whisker broom can be integrated into an implement. In such a case, the frame on an accessory can be integrated into the frame of the bucket or other implement. The scope of this disclosure is intended to include both the implement with the accessory and the work element integrated into an implement, even though only the former is discussed below for the sake of brevity.

Bucket 205 includes a machine interface 212 and a frame 222 to which whisker broom accessory 210 is operably coupled. The bucket 205 shown in FIGS. 4-8 is similar to implement 100" of FIG. 3 in that it is a simple implement with no work elements operably coupled thereto. (Of course, in the case where the whisker broom is integrated into the implement, the whisker broom would be a work element.) The types of implements to which the whisker broom accessory can be coupled is not necessarily limited to simple implements such as implement 100" and may include their own work elements.

Whisker broom accessory 210 includes a frame 223 and one or more lift arms 250, with each lift arm 250 being pivotally coupled to frame 223 at pivot attachment 252. Frame 223 as shown in this embodiment includes a pair of side plates 224 that are attachable to the bucket on opposing ends thereof and are each positioned beneath one of the lift arms 250. The side plates 224 in some embodiments act as a stop for the lift arms 250 to limit downward travel thereof, or alternatively have stops attached thereto. In some embodiments, the plates are bolted to the sides of the buckets and have a plurality of apertures to allow for the sides 224 to be attached at different positions, which in turn changes where exactly the fully lowered position can be. By allowing for adjustment of the sides (or other stops for the lift arms) to thereby allow for an adjustment of the lowest point that the lift arms can be lowered, allowing for wear compensation on the whisker broom. The frame 223 also includes a pair of side mounts 225 and center mount 227 to which lift arms 250 are operably coupled as described below. In some embodiments, the frame 223 is a single weldment including the center mount 227, the side mounts 225, and the sides 224. The whisker broom accessory 210 also includes one or more work tool arms 260 pivotally coupled to corresponding lift arm(s) 250 such that each work tool arm 260 is pivotable about a lift arm 250 about a joint 262. A work tool 265 is attached at a lower end of work tool arm 260. In exemplary embodiments, work tool 265 is a broom or brush, but this need not be the case in all embodiments.

Whisker broom assembly 210 also includes one or more biasing elements 270 in the form of springs such as tension springs pivotally attached or coupled to the lift arms 250 at pivotable attachments 272 and to work tool arms 260 at pivotable attachments 274. Biasing elements 270 bias the work tool arms to rotate so that the work tool 265 pivots away from the bucket 205. In other embodiments, other types of biasing elements can be used. For example, in some embodiments, instead coupling tension springs or other types of springs between the lift arms 250 and the work tool arms 260, the joint 262 between the lift arms 250 and the work tool arms 260 can be a torsional joint that similarly biases the work tool arms 260 with respect to the lift arms 250. In some exemplary embodiments, such as illustrated in FIGS. 4 and 5, work tool arms 260 can include reinforcing structural cross members 275 or other structural members extending there between. The effect of the biasing elements on movement of the lift arms and work tool arms is discussed below.

An actuator 226 is coupled between frame 223 at pivot attachment 228 on center mount 227 of the frame 223 and work tool arm 260 at pivot attachment 229. Actuator 226 can be pivotally attached to these cross members extending between work tool arms 260. In still other embodiments, actuator 226 can be coupled to work tool arms 260 using other connection mechanisms or structures. In exemplary embodiments, actuator 226 is a hydraulic cylinder type of actuator which can be extended and retracted under hydraulic power from the attached power machine. While disclosed embodiments are described with reference to a single actuator 226, such embodiments can include two or more actuators mechanically and/or hydraulically coupled in parallel to jointly control the same movements at the same time.

A physical stop 281 is mounted on one of the lift arms 250 to engage the cross member 275 or some other portion of the work tool arms 260 to limit travel of the work tool arms in the direction in which the work tool arms 260 are biased. In the embodiment shown and discussed here, movement in this direction is controlled by movement retraction of actuator 226. In addition, as referenced above, the engagement against the plates 224 by the lift arm 250 limits travel in the downward direction to prevent further lowering of the lift arm. Movement in this direction is controlled by extension of the actuator 226. Thus, stop 281 and plate 224 limit traffic in opposite directions of travel of the actuator 226. These stops, along with the biasing elements 270 establish a priority of movement between the lift arms 250 and the work tool arms 260 when the actuator 226 extends and retracts.

Figure 10:
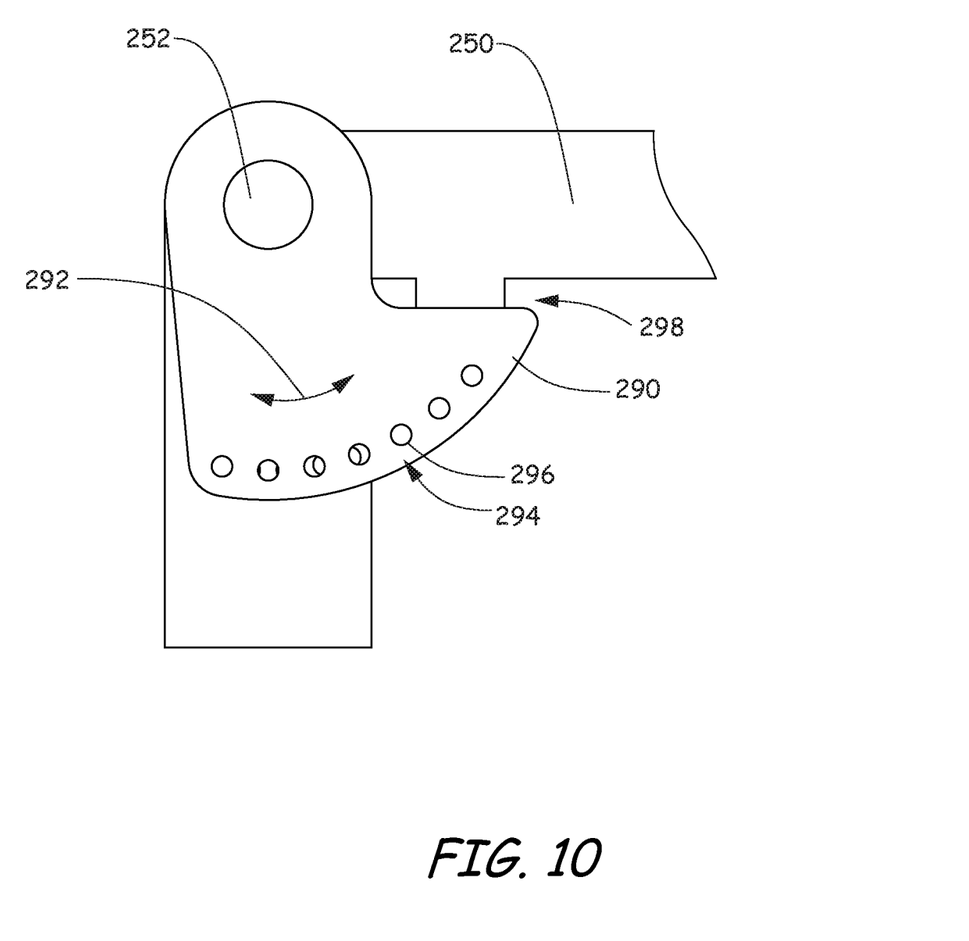
FIG. 10 is a side view illustrating a portion of an accessory showing one embodiment of an adjustable stop for a lift arm on an implement.

FIG. 10 illustrates an adjustable stop 290 for engaging lift arm 250 according to another illustrative embodiment. Adjustable stop 290 in this embodiment would replace stop 224 in previously described embodiments. Adjustable stop 290 in this embodiment is pivotally coupled to the center mount 227 at joint 252 so that adjustable stop is capable of pivoting about joint 252 as shown by arrow 292. Adjustment of the stop 290, allows for adjustment of the fully lowered position of the lift arm 250. It should be further understood that while a single stop 290 is described as being coupled to the center mount 227, in alternate embodiments such an adjustable stop can be mounted to one or both of the side mounts 225 instead of, or in addition to, the center mount 227. An engagement area 298 of the adjustable stop is positioned to engage and stop lift arm 250. A plurality of apertures 294 extend through the adjustable stop 290. In the embodiment illustrated in FIG. 10, the plurality of apertures 294 are evenly spaced along with a radius centered at joint 252. In addition, a plurality of apertures is positioned along the center mount 227 at a different spacing arrangement from the spacing arrangement. For example, the apertures 294 are spaced at seven degrees apart and the apertures in the center mount 227 are spaced at three degrees apart. With the differing spacing, adjustment of the adjustable stop 290 can be finer than the spacing of the apertures 294 of the adjustable stop. A pin 296 extends through the one of the apertures 294 and into an aligned aperture on center mount 227 (not shown) to inhibit rotation of the adjustable stop 290 during operation. FIG. 14 illustrates only one instance of aligned apertures between the adjustable stop 290 and the center mount 227 (the one through which pin 296 is extended) and other instances where the apertures are partially aligned. In other embodiments, the spacing is such that more than one pair of apertures can be aligned simultaneously.

Figure 11:
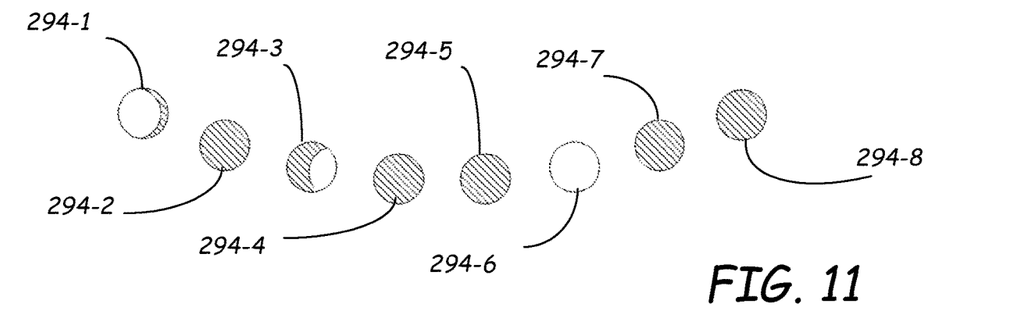
FIGS. 11-13 illustrate adjustable positions between the adjustable stop of FIG. 10 and a portion of a frame of an implement according to one illustrative embodiment.
Figure 12:
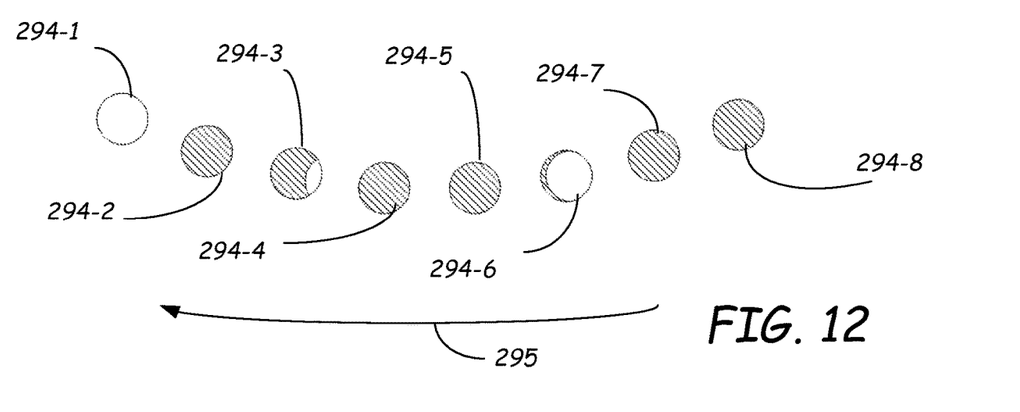
Figure 13:
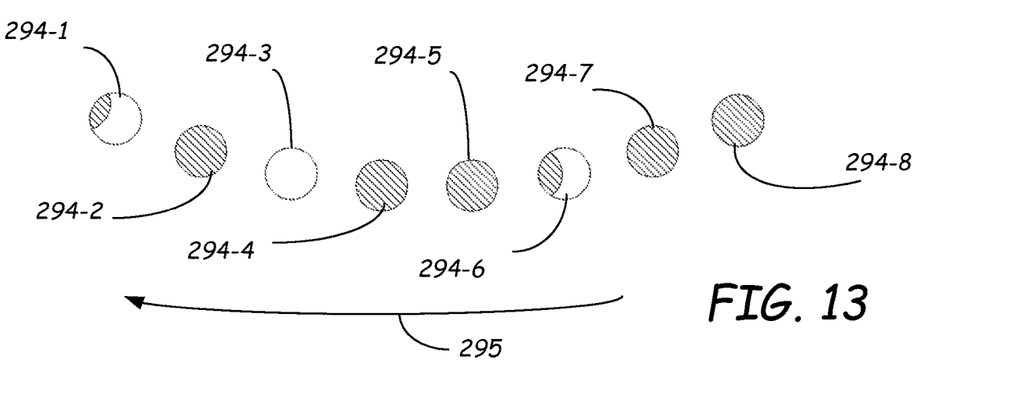

FIGS. 11-13 illustrate apertures 294 relative to apertures in the center mount 227 when the adjustable stop 290 is rotated varying amounts. For the purposes of discussion, the circular shapes in the FIGs. represent the apertures 294 in the adjustable stop while the shaded portions inside the circular shapes represent center mount 227, while unshaded portions of the circular shapes represent apertures in the center mount. Fully unshaded circular shapes illustrate alignment between apertures in the adjustable stop 290 and the center mount 227.

FIG. 11 represents the position of adjustable stop 290 as shown in FIG. 10, which is a horizontal position, that is, the engagement area 298 is in a horizontal position. As shown, there are eight apertures, identified as 294-1 through 294-8. In this position, aperture 294-6 is aligned with an aperture in the center mount so that a pin can be inserted into the aligned apertures to hold the adjustable stop into position. Apertures 294-1 and 294-3 are partially aligned with apertures in the center mount 227. The remaining apertures are neither partially nor completely aligned with apertures in the center mount 227.

In FIG. 12, the adjustable stop 290 is rotated about 0.5 degrees in the direction of arrow 295. Rotation of the adjustable stop 290 in the referenced direction will, as can be seen by referencing FIG. 10, lower the adjustable stop 290, thereby allowing the lift arm 250 to move slightly lower. On the whisker broom attachment, this lowering will cause the broom to be slightly lowered, thereby allowing an operator to compensate for wear of the bristles. In FIG. 12, aperture 294-1 is aligned with an aperture in the center mount 227. In FIG. 13, the adjustable stop 290 is rotated about two degrees in the direction indicated by arrow 295. Here, the aperture 294-3 is aligned with an aperture in the center mount 227. As can be seen in the examples shown in FIGS. 11-13, the alignment between the apertures need not be sequential as the adjustable stop is rotated. Instead, spacing of the apertures in the center mount 227 and the adjustable stop are set to provide a preferred granularity of adjustability.

Returning again to FIGS. 4-5, when neither the work tool arms 260 nor the lift arms 250 are being limited by stops, the biasing member 270 establishes a priority of movement. When the actuator is being retracted, the biasing members 270 will cause the work tool arms 260 to move because the biasing members 270 bias the work tool arms 260 in that direction and thus the work tool arms 260 will require less force than the lift arms to move. The work tool arms 260 will thus move until they reach the stop 281, at which point, the lift arms 250 will raise up until the end of travel of the actuator 226. On the other hand, when the actuator is being extended, the biasing members 270 inhibit movement of the work tool arms 260 so that movement of the lift arms 250 will lower until the lift arms rest against plates 224. Once the lift arms 250 are resting on the plates 224, the work tool arms will move rotate down and toward the bucket.

Figure 6:
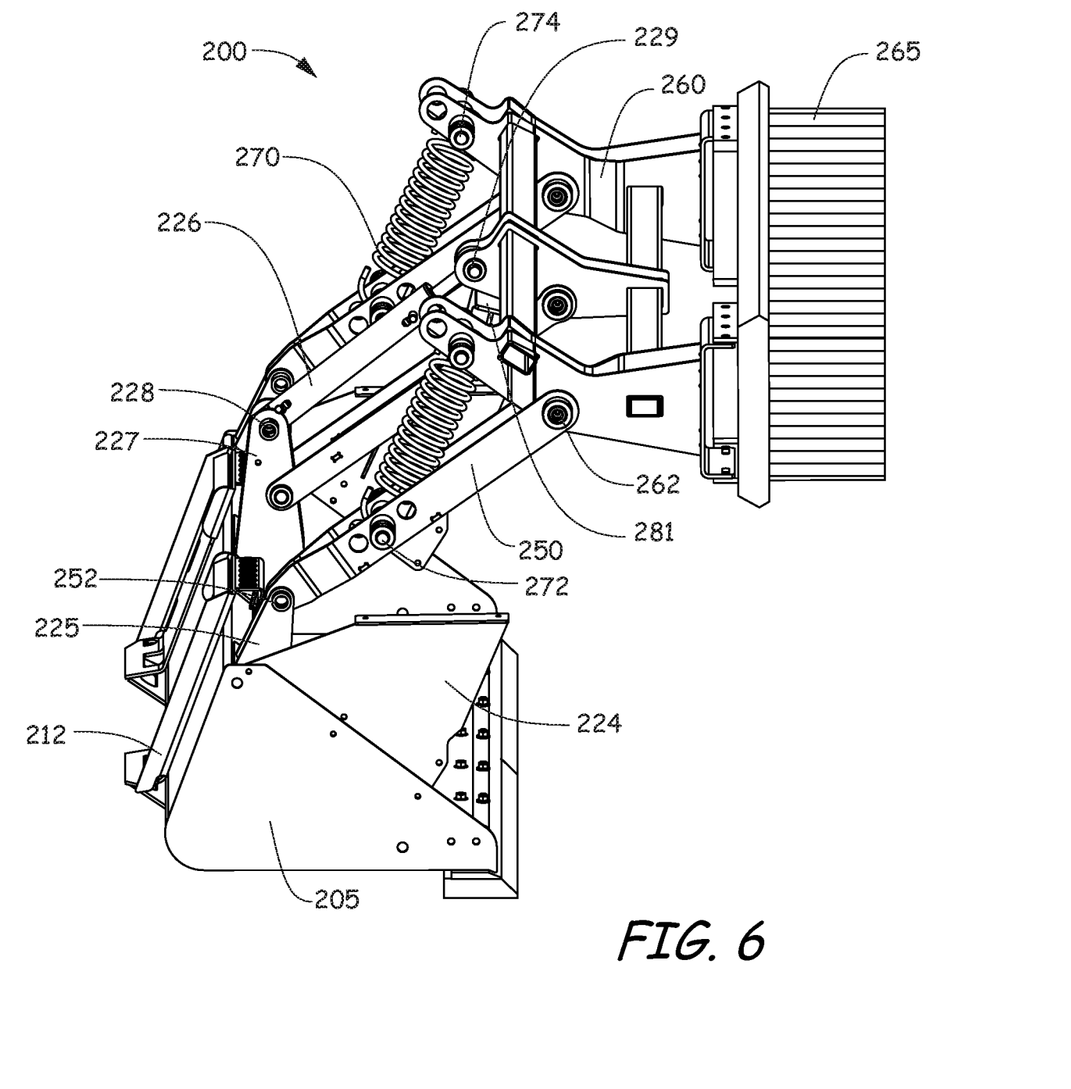
FIGS. 6-8 are perspective views of the implement shown in FIGS. 4 and 5, illustrating movement of an arm and a tool of the implement under the power of a single actuator or a set of actuators arranged in parallel.
Figure 7:
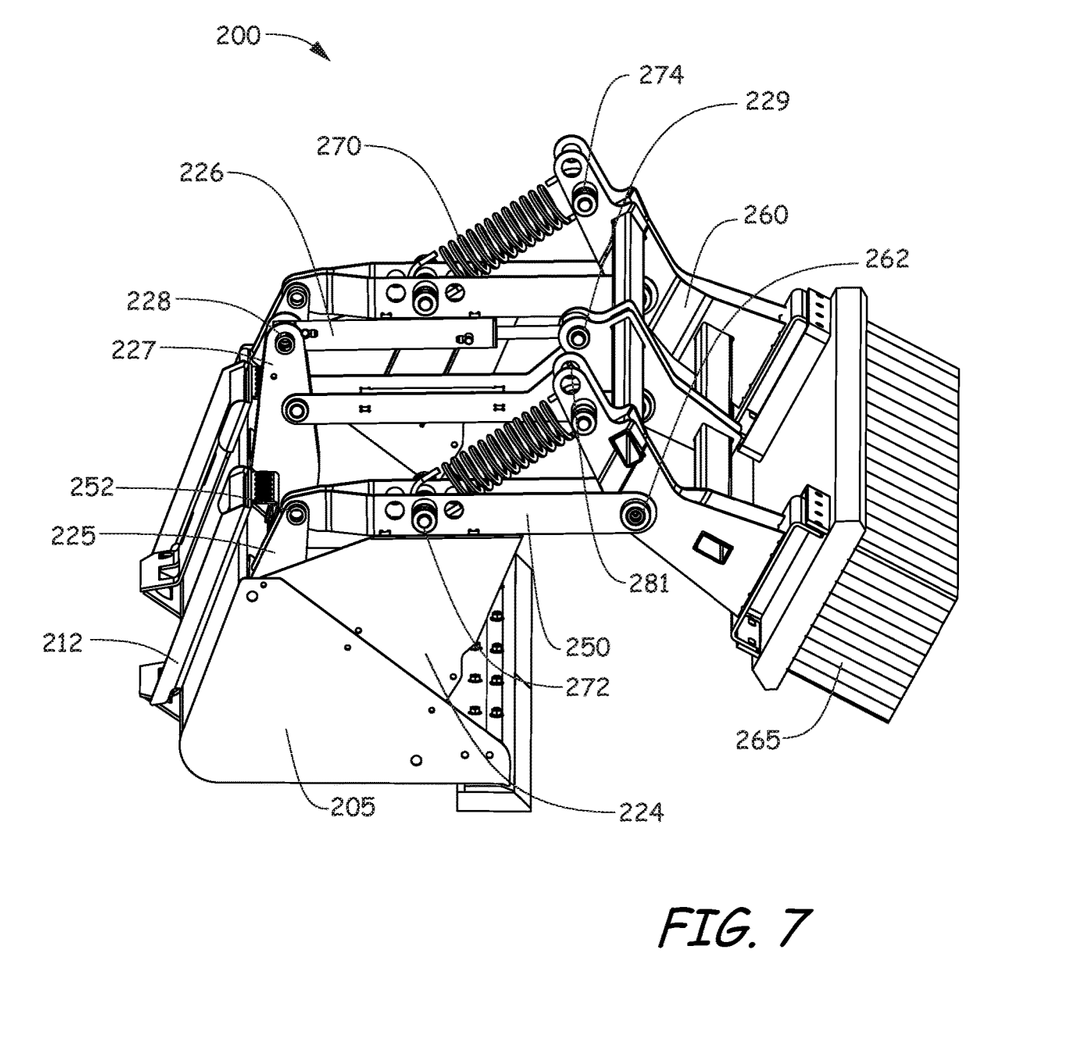
Figure 8:
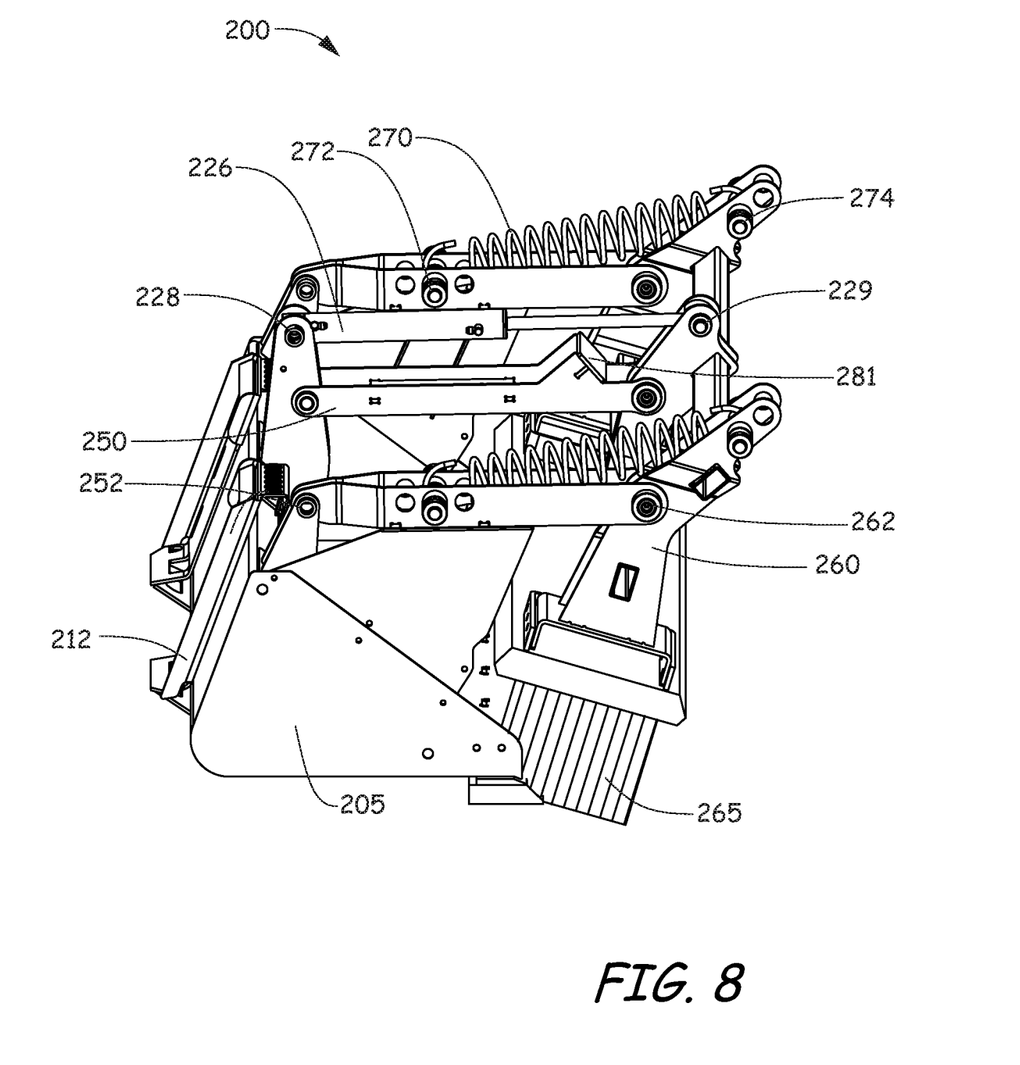

FIGS. 5-8 show the work tool 265 in various operating positions. As shown in FIG. 5, the lift arm 250 is lowered unto the plates 224 and the work tool 265 is lowered to sweep material in front of the bucket. With the lift arm 250 lowered onto the plates 224, extension of the actuator 226 will cause the work tool arms 260 to curl the whisker broom 265 toward the bucket. Retraction of the actuator 226 will cause the work tool arms 260 to rotate the whisker broom 265 away from the bucket 205 because the biasing members provide priority of movement to the work tool arms. FIGS. 7-8 show the whisker broom rotated out and then curled in to draw material into the bucket. FIG. 6 illustrates a situation where the work tool arms 260 are rotated against the stop 281. In this position, movement priority is given to the lift arm 250 in each direction.

As shown in FIG. 5, combination 200 is positioned in a first work cycle stage position which is useful for collecting debris or garbage into a pile. With combination 200 attached to a power machine (not shown), tool or broom 265 is lowered and maintained in a sweeping or collecting position with its bristles perpendicular to the support surface and the tips of the bristles being below the level of bucket 205 so that the bucket is not in contact with the support surface. This prevents damage to the pavement or to the bucket. Combination 200 is maintained in this position by extending actuator 226 to a position where lift arm 250 is lowered to its stopped position, and work tool arm 260 is rotated downward to place the work tool or brush bristles 265 in the illustrated position below work tool arm 260. With the work tool brush 265 in this position, the power machine can move implement 200 to push garbage and debris into a pile.

In a second work stage, combination 200 is positioned to begin a debris or garbage piling operation. As shown in FIG. 6, by fully retracting actuator 226, work tool arm 260 and work tool 265 are rotated outward and upward relative to lift arm 250 (the work tool arm 260 is positioned against the stop 281), and lift arm 250 is raised fully upward. Once in this position, the power machine can lower bucket 205 down to the ground such that the pile of debris or garbage is loaded by forward movement of the loader. In some exemplary embodiments, bucket 205 can be equipped with an additional polyurethane cutting edge which protects the blade from wearing out and the pavement from being damaged.

Referring now to FIG. 8, shown is a final sweeping motion position for use in loading the pile of garbage or debris accumulated within bucket 205. Here, with lift arm 250 in its fully lowered position, further extension of cylinder 226 overcomes a force of biasing elements 270 to cause work tool arm 260 and work tool or brush 265 to continue rotation and provide a sweeping motion for sweeping debris into bucket 205.

Figure 9:
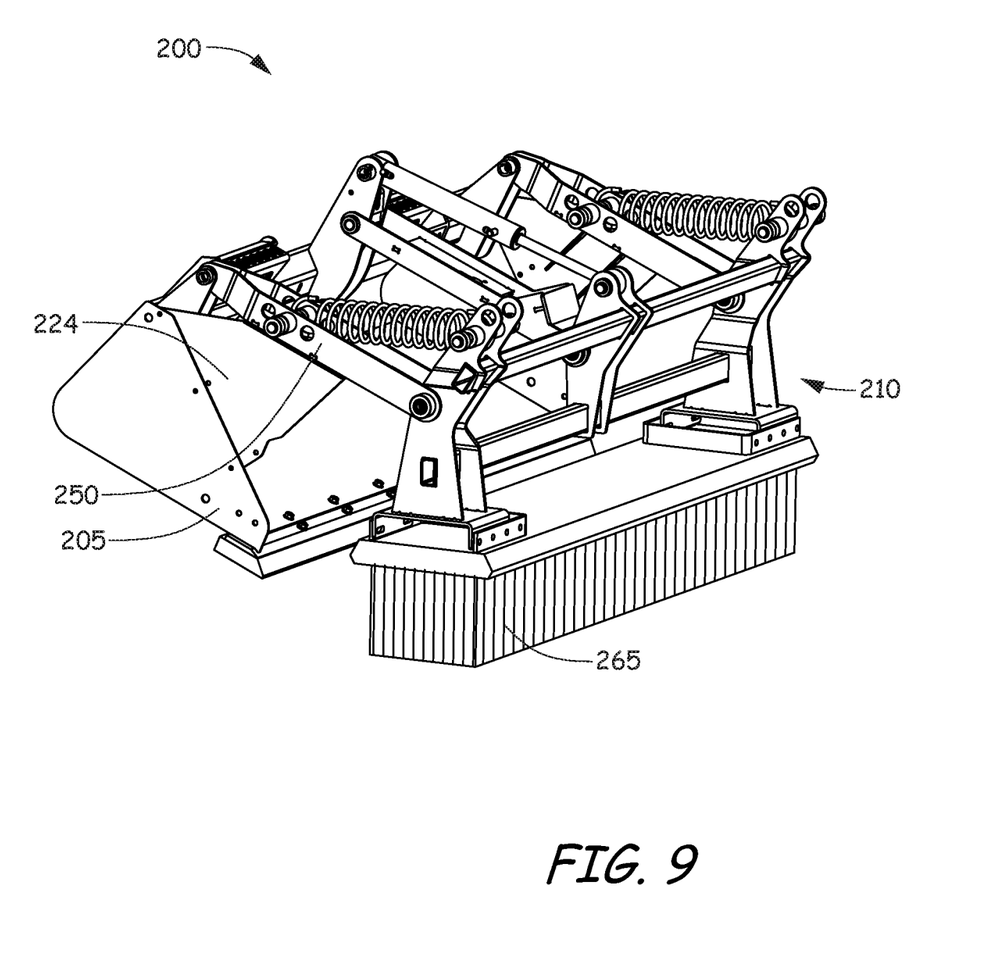
FIG. 9 is a perspective view of the implement shown in FIGS. 4 and 5, illustrating the tool in an alternative operating position.

FIG. 9 illustrates an alternative operating position of the work tool 265 of the combination 200 of bucket 205 and accessory 210. The combination 200 is operably coupled to a lift arm 310 of a power machine 300 via an implement carrier (not visible in FIG. 9). The lift arm 310 is partially raised and a tilt cylinder 320 is partially extended to position the combination 200 such that the bucket 205 is raised off the ground and tilted forward. In this position, the lift arms 250 of accessory 210 are lowered onto the sides 224 and the actuator 226 is further retracted to position so that the work tool 265 (i.e. the whisker broom) is oriented engage the ground to sweep material without the bucket 205 interfering with the ground surface.

Disclosed embodiments have been described with reference to a whisker broom implement or a whisker broom accessory attached to a bucket implement of the type commonly used with loaders. However, disclosed concepts need not be limited to whisker broom implements and accessories. Instead, disclosed embodiments can be used with various implements having a first work tool arm (e.g., an implement lift arm), a second work tool arm rotatably attached to the first work tool arm, and a work tool attached to an end of the second work tool arm to achieve separate movement of the first work tool arm relative to a frame or reference structure and movement of the second work tool arm and work tool relative to the first work tool arm with a single actuator (or set of parallel actuators).

Although the present invention has been described with reference to preferred embodiments, workers skilled in the art will recognize that changes may be made in form and detail without departing from the spirit and scope of the invention.

What is claimed is:

1. A work element configured for use with an implement of a power machine, the work element comprising:
  a work element lift arm configured to be pivotally coupled to the implement of the power machine;
  a work tool arm assembly pivotally coupled to the work element lift arm, the work tool arm assembly including at least two work tool arms and a connecting member fixedly attached between the at least two work tool arms at first locations;
  a work tool attached to the work tool arm assembly;
  a work element actuator pivotally coupled to the work tool arm assembly at a second location which is separate from the first locations and configured to be pivotally coupled to the implement of the power machine; and
  a biasing mechanism coupled between the work element lift arm and the work tool arm assembly and configured to establish a priority of movement of the work element lift arm and the work tool arm assembly responsive to actuation of the work element actuator such that the work element actuator is configured to selectively pivotally move the work element lift arm relative to the implement of the power machine by one of retraction and extension of the work element actuator and such that the work element actuator is configured to selectively pivotally move the work tool arm assembly relative to the work element lift arm by the other of retraction and extension of the work element actuator because the biasing mechanism biases the work tool arm assembly and thereby causes the work tool arm assembly to require less force to move than the work element lift arm.

2. The work element of claim 1, wherein the work element is a broom accessory and the work tool is a broom attached to the work tool arm assembly.

3. The work element of claim 2 in combination with the implement of the power machine, wherein the implement is a bucket configured to be mounted at an end of a power machine lift arm.

4. The work element of claim 1, wherein the work element lift arm comprises at least two work element lift arms.

5. The work element of claim 1, and further comprising a first stop positioned to limit travel of the work element lift arm and a second stop positioned to limit travel of the work tool arm assembly.

6. The work element of claim 5, wherein work element actuator and the biasing mechanism are arranged and configured such that when neither of the work element lift arm and the work tool arm assembly are positioned to have travel prevented by the respective first and second stops, retraction of the work element actuator causes rotation of the work tool arm assembly relative to the work element lift arm, and extension of the work element actuator causes rotation of the work element lift arm relative to the implement of the power machine.

7. The work element of claim 6, wherein the work element actuator, the biasing mechanism, and the first and second stops are arranged and configured such that retraction of the work element actuator causes rotation of the work tool arm assembly relative to the work element lift arm until movement of the work tool arm assembly relative to the work element lift arm is prevented by the second stop, and then further retraction of the work element actuator causes rotation of the work element lift arm relative to the implement of the power machine.

8. The work element of claim 7, wherein the work element actuator, the biasing mechanism, and the first and second stops are arranged and configured such that extension of the work element actuator causes rotation of the work element lift arm relative to the implement of the power machine until movement of the work element lift arm is prevented by the first stop, and then further extension of the work element actuator causes rotation of the work tool arm assembly relative to the work element lift arm.

9. The work element of claim 5, and further comprising a work element frame configured to be attached to the implement of the power machine, wherein the work element lift arm and the work element actuator are pivotally coupled to the implement by pivotal attachments to the work element frame.

10. The work element of claim 9, wherein the work element frame is configured to provide the first stop positioned to limit travel of the work element lift arm.

11. The work element of claim 9, wherein the first stop is an adjustable stop pivotally coupled to the work element frame at a stop pivotal joint, the adjustable stop having a plurality of first apertures spaced apart along a radius centered at the stop pivotal joint, the work element frame having a plurality of second apertures spaced apart along the radius centered at the stop pivotal joint, wherein alignment between one of the plurality of first apertures and one of the plurality of second apertures for receiving a locking pin determines a selected position of the first stop.

12. The work element of claim 11, wherein the plurality of first apertures and the plurality of second apertures have different degrees of spacing to increase a number of possible positions for the selected position.

13. The work element of claim 1, wherein the bias mechanism comprises a spring coupled between the work element lift arm and the work tool arm assembly.

14. The work element of claim 1, wherein the work tool is attached to the work tool arm assembly proximate distal ends of the at least two work tool arms such that the work tool extends beyond the distal ends of the at least two work tool arms.

15. An implement configured to be mounted on a power machine lift arm, the implement comprising:
a bucket;
a work element lift arm pivotally coupled to the bucket;
a work tool arm assembly pivotally coupled to the work element lift arm, the work tool arm assembly including at least two work tool arms and a connecting member fixedly attached between the at least two work tool arms;
a work tool attached to the work tool arm assembly;
a work element actuator pivotally coupled to the work tool arm assembly and to the bucket; and
a biasing mechanism coupled between the work element lift arm and the work tool arm assembly and configured to establish a priority of movement of the work element lift arm and the work tool arm assembly responsive to actuation of the work element actuator such that when neither of the work element lift arm and the work tool arm assembly are positioned to have travel prevented by stops, one of retraction and extension of the work element actuator causes rotation of the work tool arm assembly relative to the work element lift arm, and the other of retraction and extension of the work element actuator causes rotation of the work element lift arm relative to the bucket.

16. The implement of claim 15, wherein the work tool is a broom attached to the work tool arm assembly.

17. The implement of claim 16, and further comprising a first stop positioned to limit travel of the work element lift arm and a second stop positioned to limit travel of the work tool arm assembly, wherein work element actuator and the biasing mechanism are arranged and configured such that when neither of the work element lift arm and the work tool arm assembly are positioned to have travel prevented by the respective first and second stops, retraction of the work element actuator causes rotation of the work tool arm assembly and the broom relative to the work element lift arm, and extension of the work element actuator causes rotation of the work element lift arm relative to the bucket.

18. The implement of claim 17, wherein the work element actuator, the biasing mechanism, and the first and second stops are arranged and configured such that retraction of the work element actuator causes rotation of the work tool arm assembly and the broom relative to the work element lift arm until movement of the work tool arm assembly relative to the work element lift arm is prevented by the second stop, and then further retraction of the work element actuator causes rotation of the work element lift arm relative to the bucket, and such that extension of the work element actuator causes rotation of the work element lift arm relative to the bucket until movement of the work element lift arm is prevented by the first stop, and then further extension of the work element actuator causes rotation of the work tool arm assembly and the broom relative to the work element lift arm.

19. The implement of claim 18, and further comprising a work element frame attached to the bucket, wherein the work element lift arm and the work element actuator are pivotally coupled to the bucket by pivotal attachments to the work element frame.

20. A method of controlling a work element, the work element having a work element lift arm pivotally coupled to an implement, a work tool arm pivotally coupled to the work element lift arm, a work tool attached to the work tool arm, and a biasing mechanism coupled between the work tool arm and the work element lift arm, the method comprising:
  retracting and extending a work element actuator pivotally coupled to the work tool arm and to the implement; and
  using the biasing mechanism to establish priority of movement between the work element lift arm and the work tool arm such that:
    when neither of the work element lift arm and the work tool arm are positioned to have travel prevented by a stop mechanism, retraction of the work element actuator causes rotation of the work tool arm relative to the work element lift arm, and extension of the work element actuator causes rotation of the work element lift arm relative to the implement;
    when movement of the work element lift arm is prevented by a first stop mechanism during extension of the work element actuator, further extension of the work element actuator causes rotation of the work tool arm relative to the work element lift arm; and
    when movement of the work tool arm is prevented by a second stop mechanism during retraction of the work element actuator, further retraction of the work element actuator causes rotation of the work element lift arm relative to the implement.

* * * * *